United States Patent
Ryan

(10) Patent No.: US 6,245,991 B1
(45) Date of Patent: Jun. 12, 2001

(54) UTILITY POLE GUY WIRE BREAKAWAY CONNECTOR

(75) Inventor: John Patrick Ryan, 186 W. Mill Rd., Long Valley, NJ (US) 07853

(73) Assignee: John Patrick Ryan, Long Valley, NJ (US)

( * ) Notice: Subject to any disclaimer, the term of this patent is extended or adjusted under 35 U.S.C. 154(b) by 0 days.

(21) Appl. No.: 09/262,957

(22) Filed: Mar. 5, 1999

Related U.S. Application Data

(63) Continuation-in-part of application No. 08/941,508, filed on Sep. 30, 1997.

(51) Int. Cl.⁷ .................................................... H02G 7/00
(52) U.S. Cl. ............................ 174/40 TD; 174/45 TD; 174/40 R
(58) Field of Search ........................... 174/40 TD, 40 R, 174/45 TD, 146, 138 R

(56) References Cited

U.S. PATENT DOCUMENTS

| | | | |
|---|---|---|---|
| 3,049,194 | * 8/1962 | Brendel | 189/31.5 |
| 4,007,564 | 2/1977 | Chisholm | 52/98 |
| 4,246,937 | 1/1981 | Muller | 138/108 |
| 4,453,353 | 6/1984 | Killop et al. | 52/147 |
| 5,119,607 | 6/1992 | Herning et al. | 82/147 |
| 5,529,276 | 6/1996 | Szablya | 248/548 |

* cited by examiner

*Primary Examiner*—Dean A. Reichard
*Assistant Examiner*—Charlie C. Nguyen

(57) ABSTRACT

A guy wire breakaway connector for a utility pole will separate when impacted by a vehicle, to avoid damage to the vehicle or the pole, and injury to occupants of the vehicle. A pair of terminal members each has a tapered key with teeth that grip the guy wire, wedging the key against the guy wire to attach the breakaway connector. The terminal members engage one another in opposite directions, covered by a cylindrical, frangible sheath. Each terminal member has a shear surface angled to a longitudinal axis, and is disposed within a cavity in the opposite terminal member. A pivot element within each connector cavity has a beveled surface connected to the shear surface with a shear pin. The pivot elements are opposed and bear against one another in compression. A vehicle impacting the guy wire cause one the pivot elements to slide, shearing the shear pin. The terminal members will slide apart, breaking the sheath and separating the connector. A vehicle impacting the breakaway connector directly will cause the terminal members to pivot against one another, breaking the sheath and separating the connector.

12 Claims, 3 Drawing Sheets

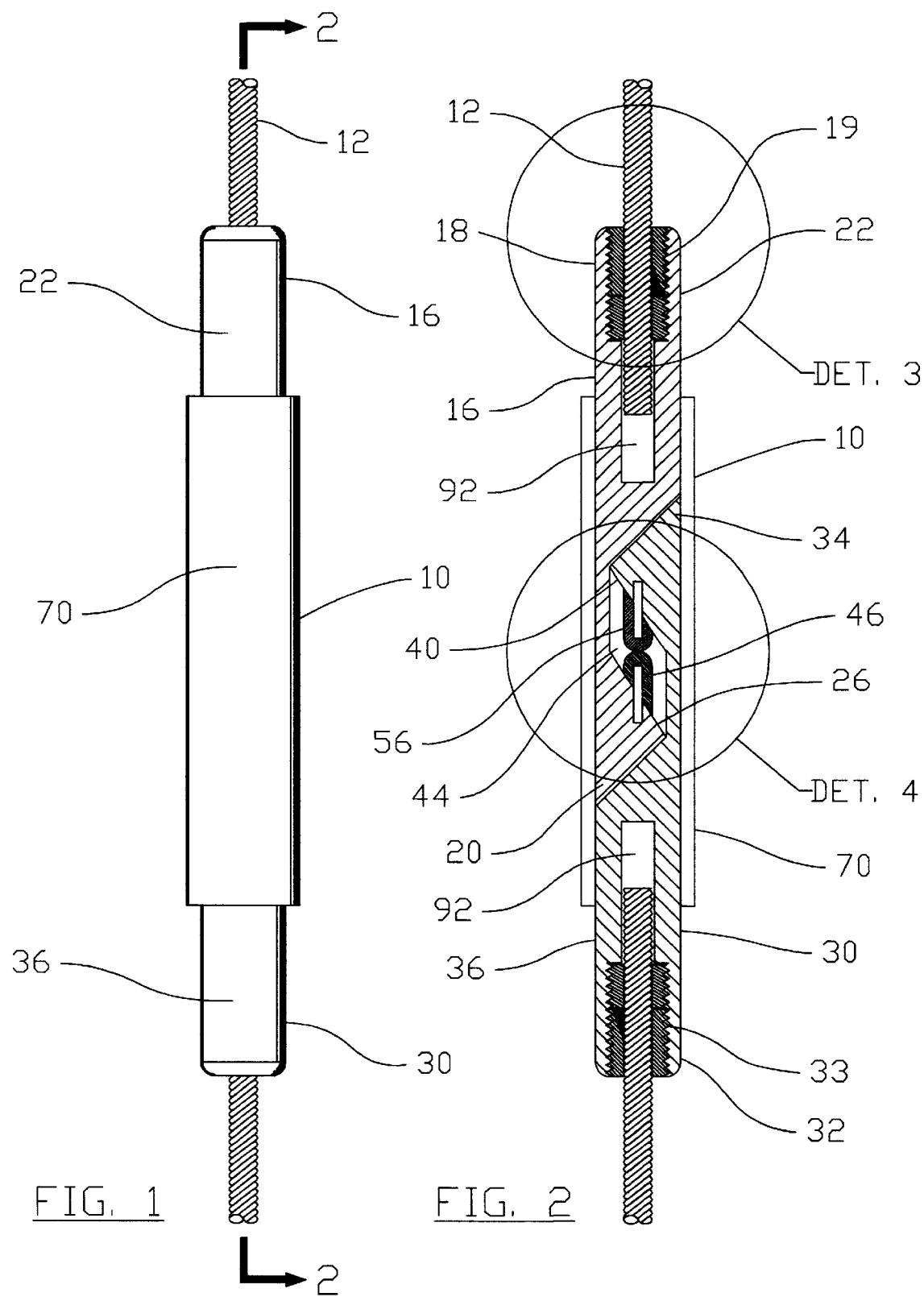

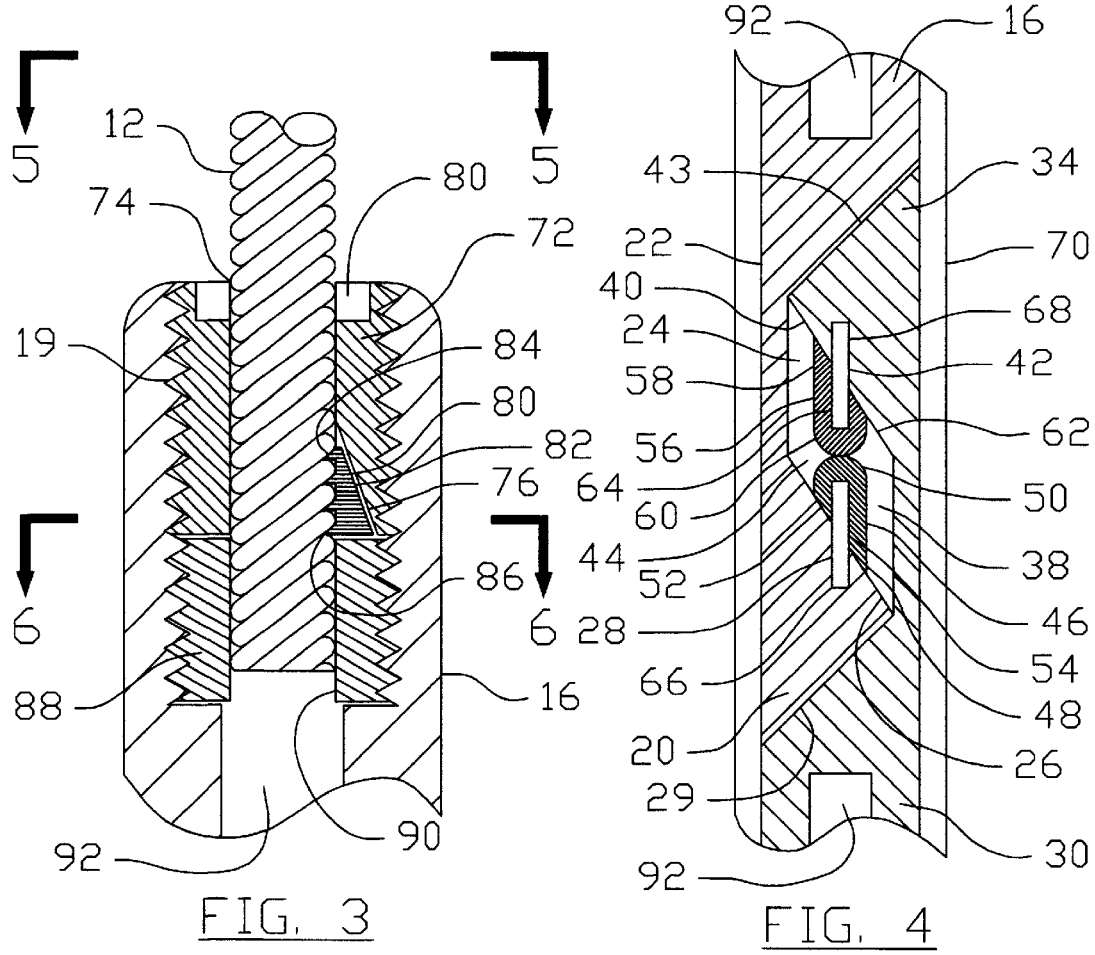
FIG. 3
FIG. 4
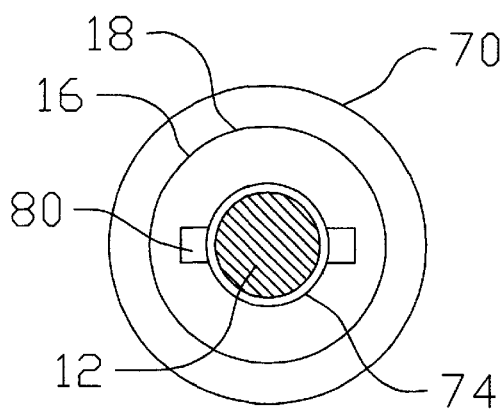
FIG. 5
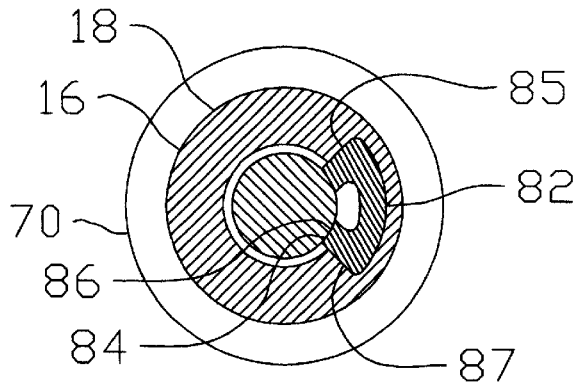
FIG. 6

UTILITY POLE GUY WIRE BREAKAWAY CONNECTOR

CROSS REFERENCES TO RELATED APPLICATIONS

This application is a continuation-in-part of a previous, pending application assigned Ser. No. 08/941,508, filed in the United States Patent and Trademark Office on Sep. 30, 1997, by John Patrick Ryan, and titled "Utility Pole Guy Wire Breakaway Holder."

FIELD OF THE INVENTION

This invention relates generally to the field of guy wire attachments, and pertains more specifically, to a frangible guy wire connector for a utility pole that will break when impacted by a vehicle.

BACKGROUND OF THE INVENTION

Conventional guy wires are used to hold utility service poles upright against unbalanced forces imposed by overhead wires, wind loads, etc. The guy wires are often, of necessity, placed near roadways in designated clear zones. A conventional guy wire will not break when impacted by a vehicle. During such an event, either the pole will break, the pole will be pulled over toward the vehicle, or the wire will cut through the vehicle. In any case, serious damage to the vehicle and to the utility pole, and injury of the occupants of the vehicle is likely.

Accordingly, there is a need to provide a guy wire breakaway connector for a utility pole or other application, that will break upon impact of a vehicle to preclude damage and injury, and that is electrically insulating in applications where needed.

There is a further need to provide a guy wire breakaway connector of the type described and that is easy to repair or replace in the field.

There is still further need to provide a guy wire breakaway connector of the type described and that is adaptable to the several different sizes of guy wire in common use.

There is yet further need to provide a guy wire breakaway connector of the type described and that is of rugged, simple construction for long service life, and that can be manufactured cost-effectively in large numbers.

SUMMARY OF THE INVENTION

The above features, as well as further features and advantages, are attained by the present invention which may be described briefly as a breakaway connector for use in connection with a utility pole guy wire. The breakaway connector comprises a first terminal member extending between a proximal end and an opposite distal end, and having a longitudinal axis. A generally cylindrical side surface extends along the longitudinal axis, and has a cavity therein. The first terminal member has a shear surface within the cavity adjacent the distal end. The shear surface faces generally toward the proximal end at a first predetermined angel to the longitudinal axis. The shear surface has a shear hole therein.

A second terminal member extends between a proximal end and an opposite distal end, and has a longitudinal axis. A generally cylindrical side surface extends along the longitudinal axis, and has a cavity therein. The second terminal member has a shear surface within the cavity adjacent the distal end and facing generally toward the proximal end. The first and second terminal members are mutually engaged with the longitudinal axes generally collinear and the proximal ends opposed. Each terminal member shear surface is disposed within the opposite terminal member cavity, with the terminal member cavities facing inward toward one another to define a connector cavity.

A first pivot element is disposed within the connector cavity and extends along the longitudinal axis between opposite first and second ends. The first pivot element first end has a beveled surface at the first predetermined angle to the longitudinal axis. The beveled surface is juxtaposed against the first terminal member shear surface, and has a hole therein aligned with the shear hole.

The first pivot element second end is directed toward the second terminal member shear surface.

A first shear pin is disposed within the first terminal member shear hole and the first pivot element beveled surface hole.

A sheath slideably engages the side surfaces of the first and second terminal members so as to retain the mutual engagement.

A connecting means is provided for connecting the guy wire to the first and second terminal member proximal ends.

Thus, in the event of a vehicle impacting the guy wire above or below the breakaway connector, tensile force will cause the first pivot element to slide upon the shear surface. This will shear the first shear pin. The first and second terminal members will then move apart laterally, breaking the sheath and thereby separating the terminal members. In the event of a vehicle impacting the guy wire directly upon the breakaway connector, the first and second terminal members will pivot against one another and move apart laterally. The sheath will break, thereby separating the terminal members.

BRIEF DESCRIPTION OF THE DRAWING

The invention will be more fully understood, while still further features and advantages will become apparent, in the following detailed description of preferred embodiments thereof illustrated in the accompanying drawing, in which:

FIG. 1 is a side elevational view of a utility pole guy wire breakaway connector constructed in accordance with the invention;

FIG. 2 is a side elevational, cross-sectional view of the breakaway connector of FIG. 1, taken along lines 2—2 of FIG. 1;

FIG. 3 is an enlarged view of Detail 3 of FIG. 2;

FIG. 4 is an enlarged view of Detail 4 of FIG. 2;

FIG. 5 is a top plan view of FIG. 3 taken along lines 5—5 of FIG. 3;

FIG. 6 is a top plan, cross-sectional view of FIG. 3 taken along lines 6—6 of FIG. 3;

DESCRIPTION OF THE PREFERRED EMBODIMENTS

Figure 7:
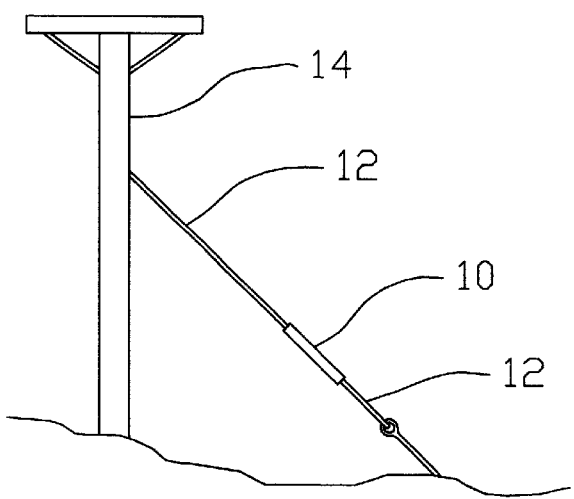
FIG. 7 is a side elevational view of a typically utility pole with the guy wire breakaway connector installed.

Referring now to the drawing, and especially to FIGS. 1, 2, 4, and 7 thereof, A breakaway connector 10 is shown in FIG. 7 used in connection with a guy wire 12 to reinforce a utility pole 14. The breakaway connector 10 comprises a first terminal member 16 extending between a proximal end 18 and an opposite distal end 20. The first terminal member 16 has a longitudinal axis and a generally cylindrical side surface 22 extending along the longitudinal axis. The side surface 22 has a cavity 24 therein. The first terminal member 16 has a shear surface 26 within the cavity 24 adjacent the distal end 20 and facing generally toward the proximal end 18 at a first predetermined angle to the longitudinal axis. The shear surface 26 has a shear hole 28 therein. The distal end 20 includes an end surface 29 slanted at a second predetermined angle to the longitudinal axis.

The proximal end 18 includes a threaded connector hole 19 collinear with the longitudinal axis.

A second terminal member 30 extends between a proximal end 32 and an opposite distal end 34. The second terminal member 30 has a longitudinal axis and a generally cylindrical side surface 36 extending along the longitudinal axis. The side surface 36 has a cavity 38 therein. The second terminal member 30 has a shear surface 40 within the cavity 38 adjacent the distal end 34 and facing generally toward the proximal end 32 at the first predetermined angel to the longitudinal axis. The shear surface 40 has a shear hold 42 therein. The distal end 34 includes an end surface 43 slanted at the second predetermined angle to the longitudinal axis. The proximal end 32 includes a threaded connector hole 33 collinear with the longitudinal axis.

The first 16 and second 30 terminal members are assembled mutually engaged with the longitudinal axes generally collinear and with the proximal ends 18 and 32 respectively, opposed to one another. Each terminal member shear surface 26 and 40, is disposed within the opposite terminal member cavity 38 and 24 respectively. The terminal member cavities 24 and 38 face inward toward one another to define a connector cavity 44. The shear holes 28 and 42 are in generally collinear alignment. The preferred material is steel, unless electrical insulation is needed, wherein a non-conducting composite is used.

Figure 9:
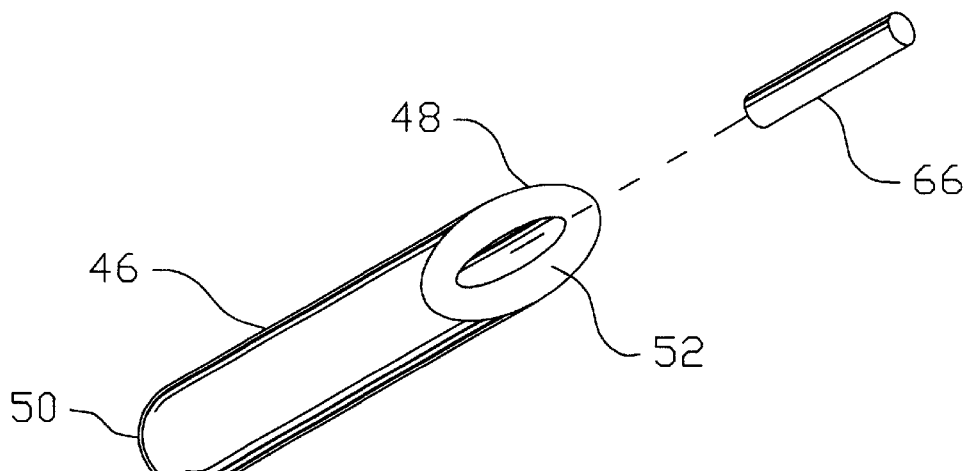
FIG. 9 is an isometric view of a pivot element and a shear pin used in the breakaway connector.

Turning now to FIG. 9, as well as FIGS. 1, 2, and 4, a first pivot element 46 is disposed within the connector cavity 44 and extends along the longitudinal axis between opposite first 48 and second 50 ends. The first pivot element 46 first end 48 has a beveled surface 52 that is beveled at the first predetermined angle to the longitudinal axis. The beveled surface 52 is juxtaposed against the first terminal member shear surface 26. The beveled surface 52 has a hole 54 therein aligned with the shear hole 28. The second end 50 is preferably spheroidal in shape, but may include a flat region.

A second pivot element 56 is disposed within the connector cavity 44 and extends along the longitudinal axis between opposite first 58 and second 60 ends. The second pivot element first end 58 has a beveled surface 62 that is beveled at the first predetermined angle to the longitudinal axis. The beveled surface 62 is juxtaposed against the second terminal member shear surface 40. The beveled surface 62 has a hold 64 therein aligned with the shear hole 42. The second end 60 is preferably spheroidal in shape, but may include a flat region. The first pivot element second end 50 is opposed to and bears against the second pivot element second end 60.

A first shear pin 66 is disposed within the first terminal member shear hole 28 and the first pivot element beveled surface hole 54.

A second shear pin 68 is disposed within the second terminal member shear hole 42 and the second pivot element beveled surface hole 64.

A sheath 70 slideably engages the side surfaces 22 and 36 of the first 16 and second 30 terminal members so as to retain the mutual engagement. The sheath 70 is preferably made of a brittle or frangible material.

Turning now to FIGS. 3, 5, and 6, as well as FIGS. 1 and 2, connecting means is provided connecting the guy wire to the first 18 and second 32 terminal member proximal ends. Specifically, a pair of threaded upper bushings 72 are provided. One threaded upper bushing 72 threadingly engages each of the connector holes 19 and 33. The upper bushing 72 has a hole 74 therethrough collinear with the longitudinal axis. The hole 74 slidingly engages the guy wire 12. The upper bushing 72 has a slot 76 with a bottom surface 78 slanted at a third predetermined angle to the longitudinal axis. A groove 80 is provided to tighten the upper bushings 72 in the threaded holes 19 and 33.

Figure 8:
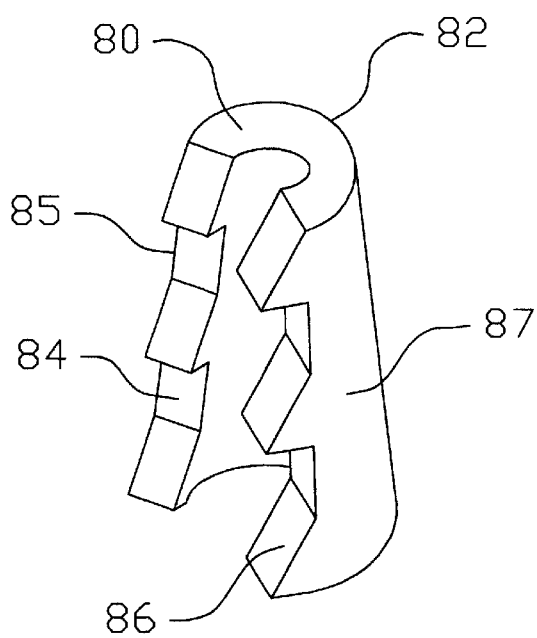
FIG. 8 is an isometric view of a tapered key used in the breakaway connector.

Referring now to FIG. 8, as well as FIGS. 2, 3, 5, and 6, a tapered key 80 is disposed within the slot 76. The key 80 has a rear surface 82 slidingly engaging the slot bottom surface 78. The key 80 has a front surface 84 with teeth 86 that grippingly engage the guy wire 12. The key 80 has opposite side surfaces 85 and 87. The tensile force on the guy wire 12 will cause the key rear surface 82 to slide upward upon the slot bottom surface 78, wedging the key against the guy wire 12. The guy wire 12 is thereby connected to the breakaway connector 10. An optical pair of threaded lower bushings 88 are provided to threadingly engage the connector holes 19 and 33 below the upper bushing 72. The lower bushing 88 has a hole 90 therethrough collinear with the longitudinal axis. The lower bushing hole 90 slidingly engages the guy wire 12. Thus, the upper bushing 72 will be locked against the lower bushing 88 and thereby will not loosen. The proximal ends 18 and 32 of the terminal members 16 and 30 respectively, each include a counterbore 92 below the threaded connector holes 19 and 33 for storing excess length of guy wire 12 while tensioning the guy wire 12.

In the event of a vehicle impacting the guy wire 12 above or below the breakaway connector 10, tensile force will cause one of the pivot elements 46 or 56 to slide upon the respective shear surface 26 or 40, shearing the shear pin 66 or 68 respectively. The first 16 and second 30 terminal members will move apart laterally, breaking the sheath 70 and thereby separating the terminal members 16 and 30. In the event of a vehicle impacting the guy wire 12 directly upon the breakaway connector 10, the first 16 and second 30 terminal members will pivot against one another and move apart laterally, breaking the sheath 70 and thereby separating the terminal members 16 and 30. The slanted distal end surfaces 29 and 43 facilitate the pivoting of the terminal members 16 and 30.

As seen from the foregoing description, the present invention satisfies the need to provide a guy wire breakaway connector that will break upon impact of a vehicle, to preclude damage and injury; that is easy to repair or replace in the field; that is adaptable to the several different sizes of guy wire in common use; that can be used for a utility pole or any other application for a guy wire; that can be used for electrically insulating the wire; that is of rugged, simple construction for long service life; and that can be manufactured cost-effectively in large numbers.

Although the invention has been described and illustrated in the preferred embodiments, those skilled in the art will make changes that will be seen to functional equivalents to the present invention. For example, although the tapered key 80 is shown with angles side surfaces 85 and 87, and with a curved rear surface 82, it will be appreciated that the key can be constructed with parallel side surfaces and a straight rear surface.

It is therefore to be understood that the above detailed description of embodiments of the invention is provided by way of example only. Various details of design and construction may be modified without departing from the true spirit and scope of the invention as set forth in the appended claims.

What is claimed is:

1. A breakaway connector for use in connection with a utility pole guy wire, the breakaway connector comprising:
   (a) a first terminal member having a proximal end and an opposite distal end, the first terminal member having a longitudinal axis and a side surface extending along the longitudinal axis, the side surface having a cavity therein, the first terminal member having a shear surface within the cavity adjacent the distal ends and facing toward the proximal end at a first predetermined angle to the longitudinal axis, the shear surface having a shear hole therein;
   (b) a second terminal member having a proximal end and an opposite distal end, the second terminal member having a longitudinal axis and an appoximately cylindrical side surface extending along the longitudinal axis, the side surface having a cavity therein, the second terminal member having a shear surface within the cavity adjacent the distal end and facing toward the proximal end, the first and second terminal members being mutually engaged with the longitudinal axes generally collinear and the proximal ends opposed, the first terminal member shear surface being disposed within the second terminal member cavity, the second terminal member shear surface being disposed within the first terminal member cavity, the terminal member cavities facing inward toward one another to define a connector cavity;
   (c) a first pivot element disposed within the connector cavity and extending along the longitudinal of the first terminal member axis between opposite first and second ends, the first pivot element first end having a beveled surface beveled at the first predetermined angle to the longitudinal axis and juxtaposed against the first terminal member shear surface, the beveled surface having a hole therein aligned with the shear hole, the first pivot element second end being directed toward the second terminal member shear surface;
   (e) a first shear pin disposed within the first terminal member shear hole and the first pivot element beveled surface hole; (f) a sheath slideably engaging the side surfaces of the first and second terminal members so as to retain the mutual engagement; and
   (g) connecting means for connecting the guy wire to the first and second terminal member proximal ends; so that
   (h) in the event of a vehicle impacting the guy wire above or below the breakaway connector, tensile force will cause the first pivot element to slide upon the first terminal member shear surface, shearing the first shear pin, the first and second terminal members will move apart laterally, breaking the sheath and thereby separating the terminal members, and in the event of a vehicle impacting the guy wire directly upon the breakaway connector, the first and second terminal members will pivot against one another and move apart laterally, breaking the sheath and thereby separating the terminal members.

2. The breakaway connector of claim 1, wherein the first pivot element second end is spheroidal in shape.

3. The breakaway connector of claim 1, wherein the distal ends of the first and second terminal members include end surfaces slanted at a second predetermined angel to their longitudinal axis, so as to facilitate the pivoting of the terminal members.

4. The breakaway connector of claim 3, wherein:
   (a) the proximal ends of the terminal members each include a threaded connector hole collinear with the respective terminal member longitudinal axis; and
   (b) the connecting means further comprises:
      a threaded first upper bushing threadingly engaging the first terminal member connector hole, the first upper bushing having a hole therethrough collinear with the first terminal member longitudinal axis, the hole slidingly engaging the guy wire, the first upper bushing having a slot with a bottom surface slanted at a third predetermined angle to the first terminal member longitudinal axis, and a threaded second upper bushing threadingly engaging the second terminal member connector hole, the second upper bushing having a hole therethrough collinear with the second terminal member longitudinal axis, the hole slidingly engaging the guy wire, the second upper bushing having a slot with a bottom surface slanted at the third predetermined angle to the second terminal member longitudinal axis; and
      a tapered key disposed within the slot, the key having a rear surface slightly engaging the slot bottom surface, and a front surface having teeth grippingly engaging the guy wire, so that the tensile force on the guy wire will cause the key rear surface to slide upward upon the slot bottom surface, wedging the key against the guy wire, thereby connecting the guy wire to the breakaway connector.

5. The breakaway connector of claim 4, further comprising:
   (a) a threaded first lower bushing threadingly engaging the first terminal member connector hole below the first upper bushing, the first lower bushing having a hole therethrough collinear with the first terminal member longitudinal axis, the hole slidingly engaging the guy wire, so that the first upper bushing will be locked against the first lower bushing and thereby will not loosen; and
   (b) a threaded second lower bushing threadingly engaging the second terminal member connector hole below the second upper bushing, the second lower bushing having a hole therethrough collinear with the second terminal member longitudinal axis, the hole slidingly engaging the guy wire, so that the second upper bushing will be locked against the second lower bushing and thereby will not loosen.

6. The breakaway connector of claim 5, wherein the proximal ends of the terminal members each include a counterbore below the threaded connector hole for storing excess length of the guy wire while tensioning the guy wire.

7. A breakaway connector for use in connection with a utility pole guy wire, the breakaway connector comprising:
   (a) a first member having a proximal end and an opposite distal end, the first terminal member having a longitudinal axis and an approximately cylindrical side surface extending along the longitudinal axis, the side surface having a cavity therein, the first terminal member having a shear surface within the cavity adjacent the distal end and facing toward the proximal end at a first predetermined angle to the longitudinal axis, the shear surface having a shear hole therein;

(b) a second terminal member having a proximal end and an opposite distal end, the second terminal member having a longitudinal axis and an approximately cylindrical side surface extending along the longitudinal axis, the side surface having a cavity therein, the second terminal member having a shear surface within the cavity adjacent the distal end and facing toward the proximal end at the first predetermined angle to the longitudinal axis, the shear surface having a shear hold therein, the first and second terminal members being mutually engaged with the longitudinal axes approximately collinear and the proximal ends opposed, the first terminal member shear surface being disposed within the second terminal member cavity, the second terminal member shear surface being disposed within the first terminal member cavity, the terminal member cavities facing inward toward one another to define a connector cavity, the shear holes being in approximately collinear alignment;

(c) a first pivot element disposed within the connector cavity and extending along the longitudinal axis of the first terminal member between opposite first and second ends, the first pivot element first end having a beveled surface beveled at the first predetermined angle to the longitudinal axis and juxtaposed against the first terminal member shear surface, the beveled surface having a hole therein aligned with the shear hole;

(d) a second pivot element disposed within the connector cavity and extending along the longitudinal axis of the first terminal member between opposite first second ends, the second pivot element first end having a beveled surface beveled at the first predetermined angle to the longitudinal axis and juxtaposed against the second terminal member shear surface, the beveled surface having a hole therein aligned with the shear hole, the first pivot element second end being opposed to and bearing against the second pivot element second end;

(e) a first shear pin disposed within the first terminal member shear hole and the first pivot element beveled surface hole;

(f) a second shear pin disposed within the second terminal member shear hole and the second pivot element beveled surface; and (g) a sheath slideably engaging the side surfaces of the first and second terminal members so as to retain the mutual engagement; and (h) connecting means for connecting the guy wire to the first and second terminal member proximal ends; so that (i) in the event of a vehicle impacting the guy wire above or below the breakaway connector, tensile force will cause one of the pivot elements to slide upon the respective shear surface, shearing the respective shear pin, the first and second terminal members will move apart laterally, breaking the sheath and thereby separating the terminal members, and in the event of a vehicle impacting the guy wire directly upon the breakaway connector, the first and second terminal members will pivot against one another and move apart laterally, breaking the sheath and thereby separating the terminal members.

8. The breakaway connector of claim 7, wherein the first and second pivot element second ends are spheroidal in shape.

9. The breakaway connector of claim 7, wherein the distal ends of the first and second terminal members include end surfaces slanted at a second predetermined angle to their longitudinal axis, so as to facilitate the pivoting of the terminal members.

10. The breakaway connector of claim 9, wherein:

(a) the proximal ends of the terminal members each include a threaded connector hole collinear with the respective terminal member longitudinal axis;

(b) the connecting means further comprises:
a threaded first upper bushing threading engaging the first terminal member connector hole, the first upper bushing having a hole therethrough collinear with the first terminal member longitudinal axis, the hole slidingly engaging the guy wire, the first upper bushing having a slot with a bottom surface slanted at a third predetermined angle to the first terminal member longitudinal axis, and a threaded second upper bushing threadingly engaging the second terminal member connector hole, the second upper bushing having a hole therethrough collinear with the second terminal member longitudinal axis, the hole slidingly engaging the guy wire, the second upper bushing having a slot with a bottom surface slanted at the third predetermined angle to the second terminal member longitudinal axis; and
a tapered key disposed within the slot, the key having a rear surface slidingly engaging the slot bottom surface, and a front surface having teeth grippingly engaging the guy wire, so that the tensile force on the guy wire will cause the key rear surface to side upward upon the slot bottom surface, wedging the key against the guy wire, thereby connecting the guy wire to the breakaway connector.

11. The breakaway connector of claim 10, further comprising:

(a) a threaded first lower bushing threadingly engaging the first terminal member connector hole below the first upper bushing, the first lower bushing having a hole therethrough collinear with the first terminal member longitudinal axis, the hole slidingly engaging the guy wire, so that the first upper bushing will be locked against the first lower bushing and thereby will not loosen; and (b) a threaded second lower bushing threadingly engaging the second terminal member connector hole below the second upper bushing, the second lower bushing having a hole therethrough collinear with the second terminal member longitudinal axis, the hole slidingly enagaging the guy wire, so that the upper bushing will be locked against the second lower bushing and thereby will not loosen.

12. The breakaway connector of claim 11, wherein the proximal ends of the terminal members each include a counterbore below the threaded connector hole for storing excess length of the guy wire while tensioning the guy wire.

* * * * *